United States Patent [19]

Barrett

[11] Patent Number: 4,514,632

[45] Date of Patent: Apr. 30, 1985

[54] MODULAR SCINTILLATION CAMERA

[75] Inventor: Harrison H. Barrett, Tucson, Ariz.

[73] Assignee: The United States of America as represented by the Department of Health and Human Services, Washington, D.C.

[21] Appl. No.: 324,464

[22] Filed: Nov. 24, 1981

[51] Int. Cl.³ .............................................. G01T 1/20
[52] U.S. Cl. .............................. 250/368; 250/363 S; 250/366
[58] Field of Search .................... 250/368, 363 S, 366; 378/2

[56] References Cited

U.S. PATENT DOCUMENTS

| | | | |
|---|---|---|---|
| 3,769,509 | 10/1973 | Martone et al. | |
| 3,908,128 | 9/1975 | Richey | 250/366 |
| 3,916,198 | 10/1975 | Coltman et al. | 250/366 |
| 4,058,727 | 11/1977 | Stout | 250/366 |
| 4,075,485 | 2/1978 | Lijewski et al. | 250/369 |
| 4,092,540 | 5/1978 | Barrett | 250/363 S |
| 4,093,857 | 6/1978 | Lapidus | 250/369 |
| 4,115,694 | 9/1978 | Lange et al. | 250/363 S |
| 4,145,609 | 3/1979 | Takami et al. | 250/368 |
| 4,181,939 | 1/1980 | Lyons | 250/369 |

OTHER PUBLICATIONS

Kujoory, "Coded Aperture Imaging of γ-Ray Sources with Off-Axis Rotating Slit", Appl. Optics, 19(24), 12-15-80.

Primary Examiner—Alfred E. Smith
Assistant Examiner—Carolyn E. Fields
Attorney, Agent, or Firm—Browdy and Neimark

[57] ABSTRACT

Improved optical coupling modules to be used in coded-aperture-type radiographic imaging systems. In a first system, a rotating slit coded-aperture is employed between the radioactive object and the module. The module consists of one pair of side-by-side photomultipliers receiving light rays from a scintillation crystal exposed to the object via the coded-aperture. The light rays are guided to the photomultipliers by a mask having a central transverse transparent window, or by a cylindrical lens, the mask or lens being mounted in a light-conveying quartz block assembly providing internal reflections at opposite faces of the assembly. This generates output signals from the photomultipliers which can be utilized to compute one-dimensional coordinate values for restoring the image of the radioactive object on a display screen. In another form of optical coupling module, usable with other types of coded-apertures, four square photomultipliers form a substantially square block and receive light rays from scintillations from a scintillation crystal exposed to the radioactive object via the coded-aperture. The light rays are guided to the photomultipliers by a square mask or a centrally transparent square lens configuration mounted in a light-conveying assembly formed by internally reflecting quartz blocks, the optical rays being directed to the respective photomultipliers so as to generate resultant output signals which can be utilized to compute image coordinate values for two-dimensional representation of the radioactive object being examined.

25 Claims, 13 Drawing Figures

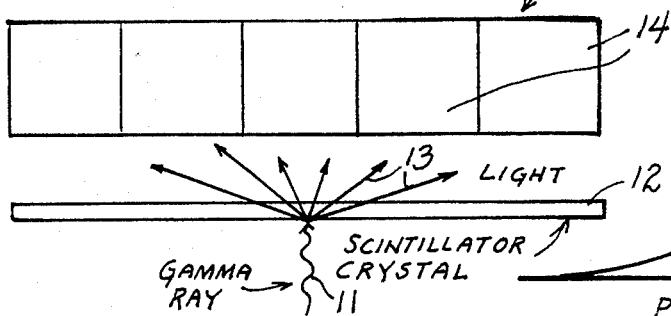
PRIOR ART FIG. 2A
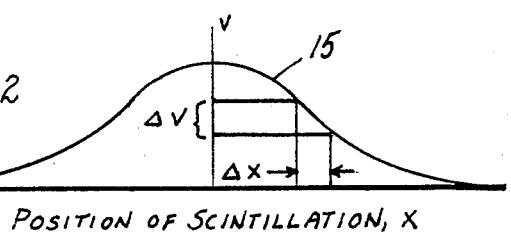
PRIOR ART FIG. 2B
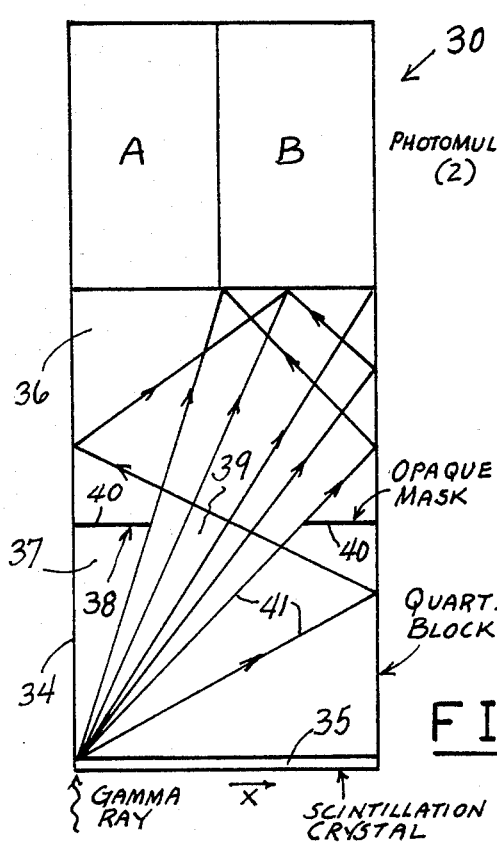
FIG. 3A
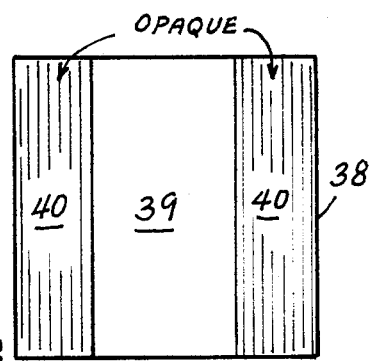
FIG. 3C
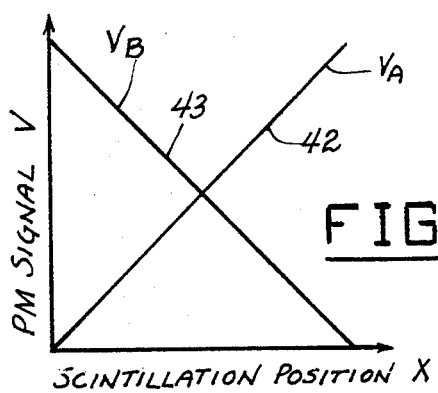
FIG. 3B
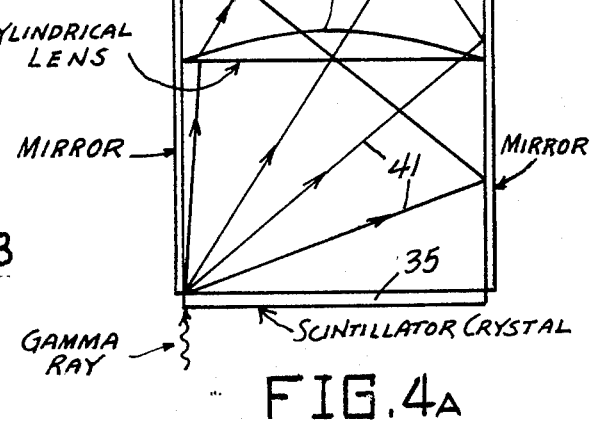
FIG. 4A

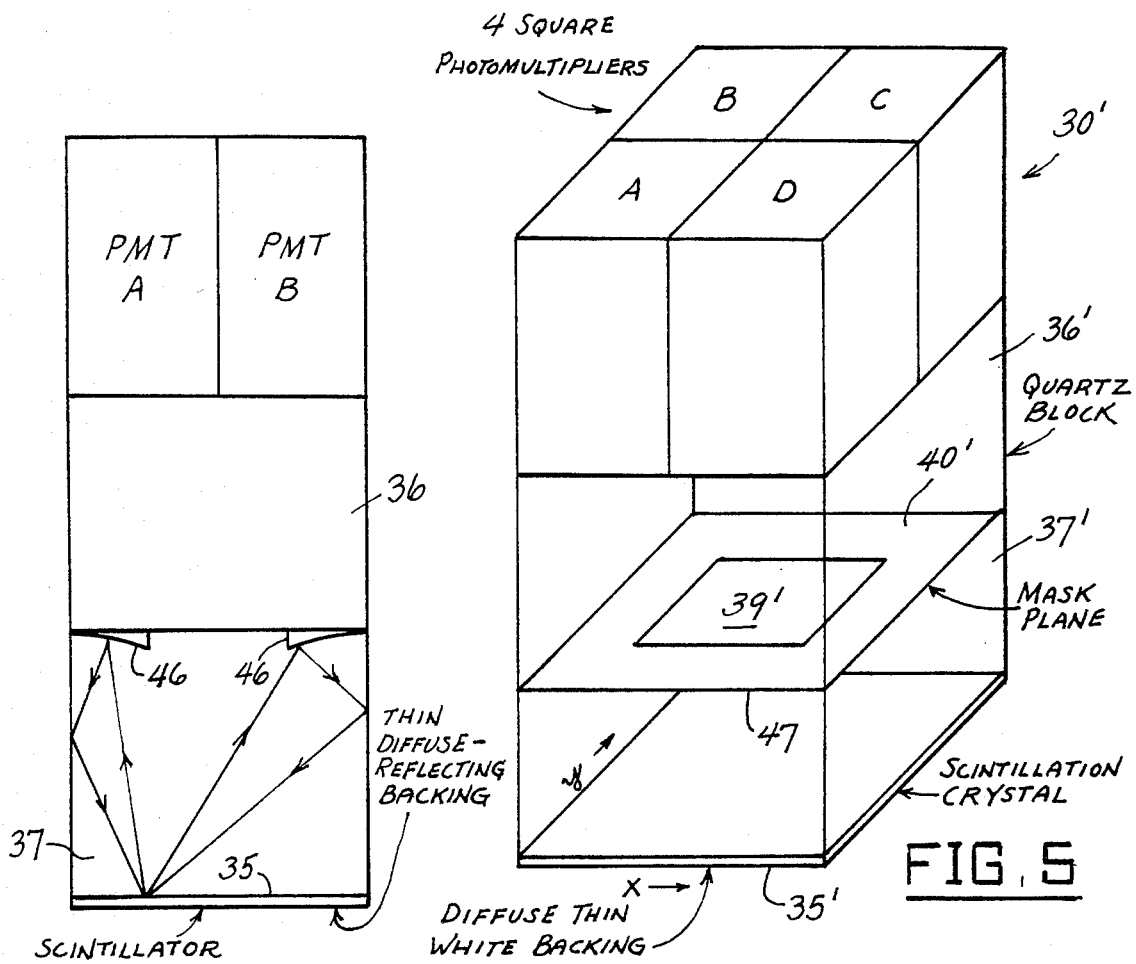
FIG. 5
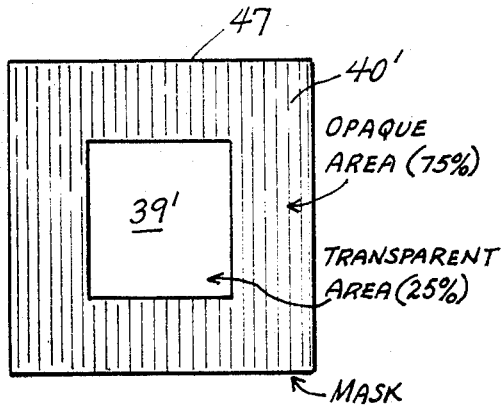
FIG. 4B
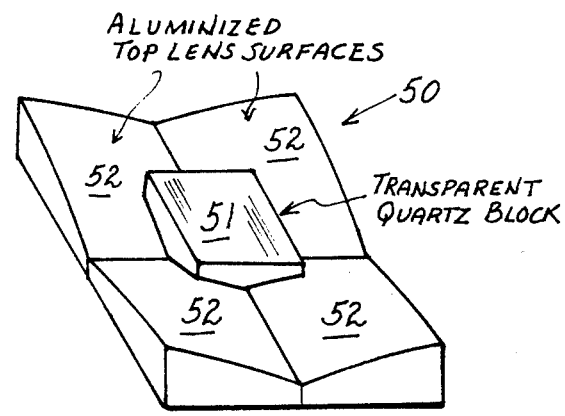
FIG. 5A
FIG. 5B

MODULAR SCINTILLATION CAMERA

FIELD OF THE INVENTION

This invention relates to radiographic cameras, and more particularly to gamma imaging devices of the scintillation camera type employing coded-aperture imaging.

BACKGROUND OF THE INVENTION

Many imaging procedures in nuclear medicine use scintillation cameras, such as the Anger Camera, in conjunction with simple lead collimators or pinhole apertures. These systems have the following deficiencies:

(1) The collimator or pinhole is very inefficient in collecting the emitted radiation. Typically only about two out of every 10,000 emitted gamma-ray photons reach the detector.

(2) The spatial resolution is rather poor. The intrinsic resolution of the detector is about 4–8 mm, while the overall system resolution including the collimator is about 10–25 mm.

(3) The count-rate capability of the detector is very limited. Current cameras can handle only 50,000–100,000 detected photons per second without saturation or loss of spatial resolution.

Coded-aperture imaging is one avenue for alleviating the first problem. Coded apertures are much more efficient than pinholes and collimators, and even though they require more detected photons for the same signal-to-noise ratio, they still offer significant advantages over the conventional apertures in many clinical situations.

Unfortunately, coded apertures exacerbate the second and third problems listed above. To make effective use of coded apertures, the intrinsic spatial resolution of the detector must be better than is currently available. Also, there is no advantage in collecting more photons if the detector cannot process them.

In a preliminary search, the following prior U.S. patents were found, which appear to illustrate the present state of the art:

Martone et al, U.S. Pat. No. 3,769,509;
Richey, U.S. Pat. No. 3,908,128;
Coltman et al, U.S. Pat. No. 3,916,198;
Stout, U.S. Pat. No. 4,058,727;
Lijewski et al, U.S. Pat. No. 4,075,485;
Barrett, U.S. Pat. No. 4,092,540;
Lapidus, U.S. Pat. No. 4,093,857;
Lange et al, U.S. Pat. No. 4,115,694;
Lyons, U.S. Pat. No. 4,181,939;

Also of interest in the publication by M. A. Kujoory et al, "Coded Aperture Imaging of Gamma-Ray Sources with an Off-axis Rotating Slit", Applied Optics, Vol. 19, page 4186, Dec. 15, 1980.

SUMMARY OF THE INVENTION

Various embodiments of novel scintillation camera detectors possessing two main common features are described herein. The first feature is that by collecting more of the light liberated in each scintillation event and making better use of it, better spatial resolution can be obtained. The second feature is that a detector consisting of N independent modules can be at least N times as fast as a conventional Anger camera in which all of the optics and electronics are tied up in processing each scintillation event.

Although the development of these modular cameras of the invention was motivated by the needs of coded-aperture imaging, they can be also very usefully employed with collimators or pinholes. In particular, the increased speed should be very valuable in cardiac imaging.

Accordingly, a main object of the invention is to provide an improved scintillation camera device of the coded-aperture type which overcomes the deficiencies and disadvantages of previous scintillation cameras employed in imaging procedures in nuclear medicine.

A further object of the invention is to provide an improved modular scintillation camera of the coded-aperture type which is highly efficient in collecting emitted radiation, which has better spatial resolution than has been previously available, and which has a relatively high detector count-rate capability.

A still further object of the invention is to provide an improved modular scintillation camera of the coded-aperture type wherein improved spatial resolution is obtained by collecting more of the light liberated in each scintillation event than has been heretofore achieved, and wherein the collected light is more efficiently employed than has been the case with scintillation camera devices previously used.

A still further object of the invention is to provide an improved modular scintillation camera of the coded-aperture type employing radiant energy sensor devices, such as photomultiplier units, wherein the signals developed by the radiant energy sensor devices can be used to compute functions which are independent of energy but which are direct measures of the positions of the generated optical rays produced by the scintillation events.

A still further object of the invention is to provide an improved modular scintillation camera of the coded-aperture type which can be either one-dimensional in the sense that it is capable of determining only one coordinate of the scintillation location, such as would be required, for example, with a rotating-slit coded aperture, or which can be designed for more general imaging applications, such as for two-dimensional imaging.

A still further object of the invention is to provide an improved modular scintillation camera assembly of the coded-aperture type which is one-dimensional in that it is capable of determining only one coordinate of a scintillation location but which is suitable for use with a slit coded aperture, or slat collimation apertures, of the rotating type.

A still further object of the invention is to provide an improved modular scintillation camera assembly of the coded aperture tyep which is two-dimensional so that it can be used successfully for general imaging applications, such as with distributed pinhole apertures or with distributed collimator-type apertures.

BRIEF DESCRIPTION OF THE DRAWINGS

Further objects and advantages of the invention will become apparent from the following description and claims, and from the accompanying drawings, wherein:

FIG. 1B is a fragmentary diagrammatic perspective view showing the system of FIG. 1 modified for one-dimensional camera operation.

FIG. 2A is a diagrammatic view illustrating the basic geometry of a conventional Anger camera and showing the photon distribution from a scintillation event.

FIG. 2B is a plot showing the variation with scintillation position of the signal from the central photomultiplier tube of the array shown diagrammatically in FIG. 2A.

FIG. 3A is a diagrammatic view of a scintillation camera module according to the present invention, said module being of the one-dimensional type suitable for use in a rotating-slit gamma ray imaging system such as that shown in FIG. 1.

FIG. 3B is a graph showing variation with position of the scintillation event of the photomultiplier signals from the two photomultiplier tubes shown in FIG. 3A.

FIG. 3C is a plan view of the ray masking member employed in the one-dimensional camera module of FIG. 3A.

FIG. 4A is a diagrammatic view of a modified one-dimensional camera module according to the present invention, employing a cylindrical lens instead of a masking member.

FIG. 4B is a diagrammatic view of another modification of a one-dimensional scintillation camera module according to the present invention, employing focussing mirrors instead of the opaque masking elements of FIG. 3A.

FIG. 5 is a diagrammatic perspective view of a two-dimensional camera detector module according to the present invention using four square photomultiplier units.

FIG. 5A is a plan view of a ray masking member employed in the camera module of FIG. 5.

FIG. 5B is a perspective view of an optical assembly which may be employed in the two-dimensional camera module of FIG. 5 in place of the ray masking member to maximize the light reaching the photomultiplier units.

DETAILED DESCRIPTION OF PREFERRED EMBODIMENTS

Figure 1:
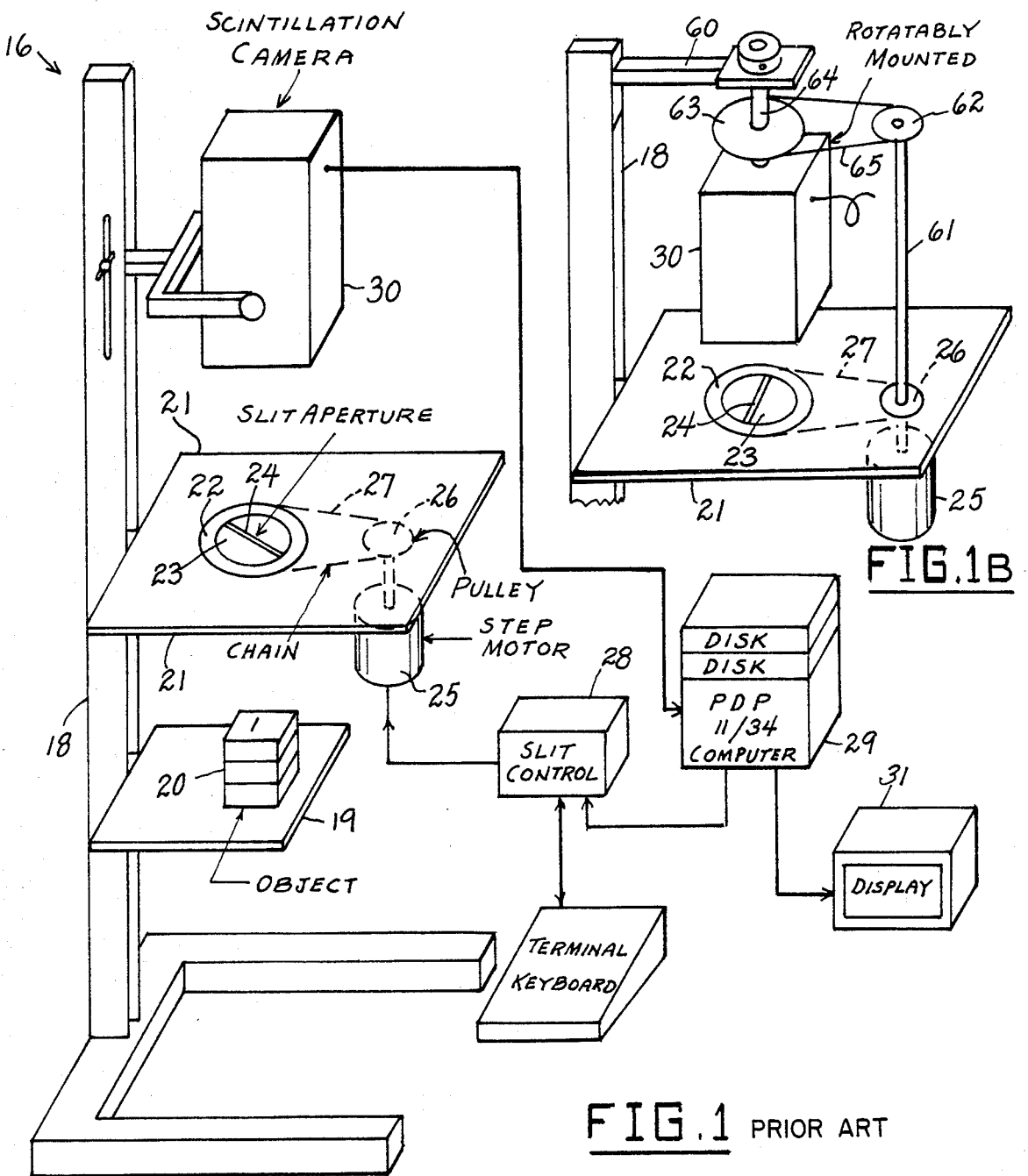
FIG. 1 is a diagrammatic perspective view of a gamma ray imaging system of the prior art step-rotating slit type. This known system is shown employing a scintillation camera module constructed in accordance with the present invention, arranged for two-dimensional imaging.

To appreciate the advantages provided by the novel and improved scintillation detectors of the present invention, it is useful to first review some features of the conventional Anger camera. The basic geometry of the Anger camera is shown in FIG. 2A. The gamma ray 11 of energy 140 keV, the most common energy in clinical practice, produces some 4500 optical photons resulting from a scintillation event in the scintillation crystal 12. These photons, shown at 13, are then spread out over the entire array of photomultipliers 14 (usually 19 or 37 in number) with less than 10% of the light falling on any one photomultiplier unit 14. Thus, with a 25% quantum efficiency, the photomultiplier unit 14 nearest to the scintillation event will have a signal of only about 100 photoelectrons. More distant photomultiplier units will have still weaker signals. It is the statistical fluctuations in these weak PMT signals that limits the spatial resolution in the Anger camera. As shown in FIG. 2B, a plot of the signal from one PMT 14 as a function of scintillation position is a bell-shaped curve 15 similar to a Lorentzian function. The slope of this curve 15 relates the uncertainty in the PMT signal to an uncertainty in position. The spatial resolution can be improved by either collecting more light and reducing the uncertainty in the PMT signal, or by increasing the slope of the signal vs. position curve 15. Neither alternative offers much hope within the basic Anger configuration. Obtaining more signal strength would require substantial improvements in scintillator or PMT technology, while to increase the slopes of the curve 15 would necessitate using more PMT units to cover the desired area.

The usual Anger scintillation camera is poorly suited to coded-aperture imaging because of its low count-rate capability and poor spatial resolution.

A typical coded-aperture imaging system is illustrated diagrammatically in FIG. 1 and is designated generally at 16. The imaging system 16 comprises a supporting stand 17 provided with an upstanding vertical post 18. A bottom horizontal shelf 19 is secured to the post 18 and supports the radioactive object 20 to be examined. Another horizontal shelf 21 is secured to post 18 above shelf 19 and has a rotatable ring 22 in which is secured a disc 23 of radiation-opaque material having a diametral slit 24. The ring 22 is rotated in steps by a step motor 25 carried by shelf 21. Motor 25 rotates ring 22 in steps via a pulley 26 and a drive chain 27, the slit rotation being controlled by a suitable slit control assembly 28 which receives information for the rotation (number of steps and number of seconds per step) from a PDP 11/34 computer 29 and generates the control and clock pulses to drive the step motor 25 as required. The number of degrees of rotation per step can be set through suitable thumbwheel switches, not shown, on the control unit 28.

A scintillation camera module 30 arranged for two-dimensional imaging according to the present invention is adjustably mounted on the post 18 above the shelf 21 in vertical alignment with the slit and the object 20, and is interfaced to the PDP 11/34 computer 29. The computer 29 stores the acquired data for each orientation on a magnetic disk during the data collection procedure and processes the data for reconstruction. The reconstructed image file is finally displayed on a Conrac video monitor 31 for analysis.

Figure 1A:
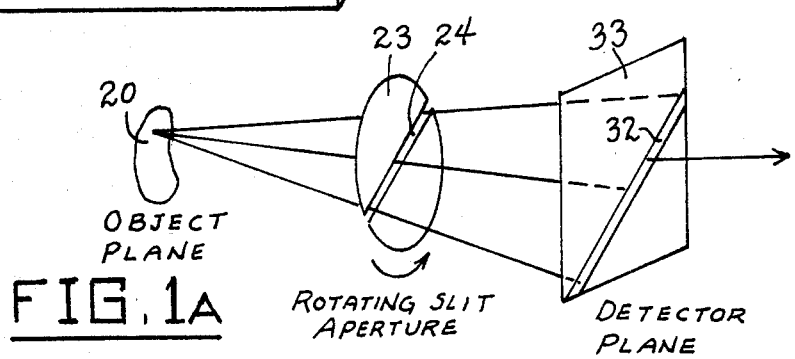
FIG. 1A is a diagram illustrating the geometry of the imaging system of the rotating slit apparatus of FIG. 1.

FIG. 1A diagrammatically illustrates the optical geometry of the rotating slit apparatus 16, indicating that the imaging through the slit 24 occurs along a projection of gamma radiation at a linear region 32 in a detector plane 33 comprising the scintillation crystal plane of the camera.

FIG. 1B shows a modification of the system of FIG. 1, arranged for one-dimensional imaging, namely, to rotate the camera module 30 synchronously around the same vertical axis with the slit aperture 24 so that the resolving direction of the camera module remains perpendicular to the long axis of the slit. The camera 30 is rotatably suspended on a bracket arm 60 rigidly secured to post 18, and is driven stepwise synchronously with slit aperture 24 by a vertically upstanding extension 61 of the shaft of motor 25 and a pulley 62 thereon which drives a pulley 63 on the camera suspension shaft 64 via a drive chain 65. The driving ratio of the pulleys 62, 63 is the same as the driving ratio of pulley 26 and ring 22, whereby to maintain synchronism.

Referring to FIG. 3A, the scintillation camera module 30 comprises a generally rectangular housing 34 provided in its upper portion with the side-by-side photomultiplier units A and B which face downwardly toward a flat scintillation crystal 35 mounted in the bottom end of housing 34. A pair of similar rectangular quartz blocks 36, 37 are mounted, one above the other, in the housing 34 between the photomultiplier units A, B and the scintillation crystal 35 and are cemented to the top and bottom surfaces of an intervening rectangular mask member 38 (see FIG. 3C) having a central optically transparent transverse area 39 and respective equal transverse side marginal areas 40, 40 which are opaque, said opaque areas together covering approximately half of the total area of the mask.

With the geometry shown in FIG. 3A, nearly 50% of the light from each scintillation event ultimately impinges on the two photomultipliers A and B, the only losses being in the mask 38, which is opaque over half its area, and the small losses due to imperfect internal reflections of the rays 41 from the sides of the quartz blocks 36, 37. FIG. 3A is drawn with the scintillation event occurring at the left edge of the crystal 35. It can be seen by ray tracing that none of the light from this event reaches the photomultiplier unit A. The signal from PMT A, designated as $V_A$, is zero at this point, but then increases linearly as the scintillation event is moved to the opposite edge of the crystal (see linear curve 42 in FIG. 3B). Similarly, $V_B$, the signal from photomultiplier unit B decreases linearly, as shown at 43 in FIG. 3B. The quantity $V_A+V_B$ is independent of position and is a measure of the energy of the excitation gamma ray. On the other hand, the quantity $(V_A-V_B)/(V_A+V_B)$ is independent of energy and is a direct measure of position x. This quantity is derived in the computer 29 during the operation of a system such as that shown in FIG. 1, and is suitably processed in said computer.

A first variation of this one-dimensional camera configuration is shown in FIG. 4A. Here the mask 38 is replaced by a cylindrical lens 44 secured horizontally between opposite vertical parallel side mirrors 45, 45. With this arrangement the dependence of $V_A$ and $V_B$ on x is unchanged, but nearly all of the generated light rays impinge on the PMT asssembly A, B. In practice, the major losses will be in reflection at the various air-glass interfaces.

FIG. 4B illustrates a second modification of the basic one-dimensional camera module in which the partly-opaque mask 38 is replaced by opposite transversely extending, marginal focussing mirrors 46, 46. Light rays that would have been absorbed by the mask are now returned to their starting points, where they can be diffusely reflected by a thin diffuse-reflecting backing provided on the scintillator 35 and have a second opportunity to reach the photomultiplier units A and B. The mirrors 46,46 are cylindrical.

As so far described, any of the camera detector modules shown in FIGS. 3A, 4A and 4B is one-dimensional in the sense that it is capable of determining only one coordinate of the scintillation location. This is all that is required in a system employing a rotating slit-coded aperture, such as that shown in FIG. 1. However, for more general imaging applications a two-dimensional camera detection module is needed. FIG. 5 illustrates a two-dimensional extension of the same basic concept as is employed in FIGS. 3A, 4A and 4B. In the two-dimensional module of FIG. 5, designated generally at 30', a generally square mask 47 is employed between the generally square upper quartz block 36' and the correspondingly-shaped lower quartz block 37'. Four square photomultiplier units A, B, C and D are mounted on the upper quartz block 36', facing downwardly thereon in a square block configuration, as shown in FIG. 5. The mask 47 has a central square transparent aperture portion 39' with an opaque perimeter area 40' which constitutes about 75% of the total mask area, while the central transparent portion 39' constitutes about 25% of said total mask area. The square scintillation crystal, shown at 35', underlies the lower quartz block 37'. The scintillation crystal 35' may be provided with a diffuse white backing for a purpose presently to be described.

A suitable protective housing, not shown, may enclose the scintillation camera assembly shown in FIG. 5.

The sides of the quartz blocks 36',37' are preferably aluminized, so that the only appreciable light loss is absorption in the opaque portion 40' of the mask. The x coordinate of the scintillation position is found by adding the signals $V_A$ and $V_B$ from the photomultipliers A and B and treating the result as a single PMT signal in the one-dimensional module. Similarly, the signals $V_C$ and $V_D$ are added to produce the other one-dimensional signal. Similarly, the y coordinate is found by using $V_A+V_D$ as one one-dimensional signal and $V_B+V_C$ as the other one-dimensional signal. Thus, in the arrangement shown in FIG. 5, the x and y coordinates are measured by $$x = \frac{(V_A + V_B) - (V_C + V_D)}{V_A + V_B + V_C + V_D}$$

$$y = \frac{(V_A + V_D) - (V_B + V_C)}{V_A + V_B + V_C + V_D}$$

where $V_A$ is the signal from photomultiplier unit A,
$V_B$ is the signal from photomultiplier unit B,
$V_C$ is the signal from photomultiplier unit C, and
$V_D$ is the signal from photomultiplier unit D.

The drawback to this approach is that approximately 75% of the scintillation light is wasted by the mask 47. However, there are several ways in which the mask can be replaced by a lens or prism arrangement or by a suitable mirror arrangement to capture nearly all of the scintillation light and direct it onto the proper photomultiplier units. For example, as shown in FIG. 5B, to direct nearly all of the scintillation light onto the PMT units A, B, C and D in the two-dimensional module 30', the mask 47 in FIG. 5 can be replaced by the optical assembly 50 of FIG. 5B. In this assembly, the central square piece 51 is a transparent quartz block congruent with the transparent portion 39' of the mask 47 of FIGS. 5 and 5A. The four curved pieces 52, produced by cutting up a spherical quartz lens into quadrants, are aluminized on their upper surfaces and serve functions similar to that of the cylindrical mirrors 46 in FIG. 4B. In the arrangement using the device 50 of FIG. 5B, the light rays that would have been absorbed by the opaque portion 40' of mask 47 are reflected back to where they originated. The scintillation crystal 35' is preferably provided with a diffuse thin white backing, so that some of the reflected light then gets a second chance to travel through the transparent member 51, and the remainder strikes the spherical mirrors on lens segments 52 and is again reflected back. With perfect reflection on lens segments 52, almost 100% of the light would eventually reach the PMT assembly.

Another possible alternative arrangement would be to replace the opaque portion 40' of mask 47 with a set of prisms, each oriented so as to redirect the light onto the proper PMT unit. This would be embodied in an arrangement generally similar to that illustrated in FIG. 5B except that the lenses 52 would be of the clear focussing type without any top layer of opaque mirror material.

The novel configuration of FIGS. 5, 5A and 5B offers increased flexibility because it is extended to two dimensions, as compared with the one-dimensional configurations of FIGS. 3A, 4A and 4B. (Of course, in either case the final image at the display unit 31 will be two-dimensional, or may even be three-dimensional when the detector is used with a suitable imaging aperture and with appropriate data processing).

One of the primary advantages of the above-described scintillation camera devices is that they are "modular". A "module" consists of a scintillation crystal, optical structure, two to four photomultipliers, and the necessary electronics. All modules are completely independent, so that a camera consisting of N modules is automatically N times faster than a conventional scintillation camera. In practice, N may be 10 to 30. Furthermore, the optical structure in each module is extremely efficient, so that almost all of the light produced in each scintillation event reaches the photomultipliers, thereby reducing statistical fluctuation in the PMT signals and improving the spatial resolution.

As above mentioned, a "coded aperture" is an alternative to the conventional imaging apertures and means, namely, pinholes, parallel-hole collimators, or the like. The "coded aperture" offers a large increase in photon collection efficiency over the conventional apertures. Even though it also requires more photons for the same statistical accuracy in the image, the coded aperture is expected to offer a net advantage by a factor of 2 to 10 in patient dose or exposure time in most clinical applications. In addition, coded apertures can provide a degree of tomographic or three-dimensional imaging that is absent with the conventional apertures. As above stated, the usual Anger scintillation camera is poorly suited to coded-aperture imaging because of its low count-rate capability and poor spatial resolution.

The typical system embodiment of FIG. 1 employs a coded aperture of the rotating slit type. Another coded aperture is the "Fourier" aperture. Both of these apertures can be used with a one-dimensional scintillation detector of the present invention, such as is shown in FIGS. 3A, 4A or 4B. The rotating slit aperture measures a set of *planar* integrals of the radioactive object, as opposed to the *line* integrals that form the basic data for conventional emission computed tomography. The specific advantages of using a coded aperture have already been pointed out above.

Multiple-pinhole imaging systems using the Anger camera have been recently developed. See Vogel et al, "A New Method of Multiplanar Emission Tomography Using a Seven-pinhole Collimator and an Anger Scintillation Camera", J. Nucl. Med. 19, 648(1978). Although such a system has had some success, the quality of its images is still limited by the use of the Anger camera as the detector. The Anger camera limits the number of pinholes that can be used, the spatial resolution of the individual images (and hence the reconstruction), the maximum viewing angle that can be used, and the total count rate. All of these problems can be alleviated by use of modular cameras according to the present invention, employing one two-dimensional module 30' such as is disclosed in FIG. 5, with each pinhole, with some modification of the Vogel et al algorithm if the modular detectors are not coplanar. In addition, there is a possibility of using a modestly coded pinhole array in which some degree of overlap or multiplexing of the pinhole images is allowed. Perhaps three or four pinholes could be used with each camera module.

Of course, the two-dimensional module can also be used for any application in which an Anger camera is now used. A single module and a collimator could be embodied in a convenient inexpensive portable camera for small organs, such as the thyroid or the heart. At the opposite extreme, a large array of modules could be used to perform a whole-body survey for bone or soft tissue tumors without mechanical scanning. Thus, the term "image forming means" as used herein shall be understood to include coded apertures, pinholes, collimators, arrays thereof and the like, as is well understood in these arts and explained in detail above.

A probable practical embodiment of a one-dimensional module 30 will have an active scintillation area of 5 cm×10 cm per module and employ two 5 cm×5 cm square photomultipliers, such as RCA type C83003E, and will use NaI(T1) scintillation material of a thickness of 3 mm.

A probable practical embodiment of a two-dimensional module 30' will have an active area of 10 cm×10 cm and employ four 5 cm×5 cm square photomultipliers.

While certain specific embodiments of optical coupling modules, or camera devices, for use in radiographic imaging systems have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. An imaging system for a radioactive object comprising a scintillation camera device and image forming means between said radioactive object and said camera device, said camera device comprising at least one pair of side-by-side photoelectric detection units forming an array extending in a predetermined direction, scintillation crystal means mounted to receive gamma rays from the radioactive object via said image forming means, said detection units being mounted so as to receive optical photons from scintillations in said crystal means corresponding to image coordinates of said object along said predetermined direction, and optical ray-guiding means between said photoelectric detection units and said scintillation crystal means to distribute such optical photons from a scintillation to the respective photoelectric detection units so that the respective resultant signals generated by the photoelectric detection units vary substantially linearly with respect to said predetermined direction over a range substantially comprising the width of said array and so that said resultant signals can be utilized to computer image coordinate values over said range.

2. The imaging system of claim 1, and wherein said image forming means comprises a body of radiation-opaque material provided with a radiation-transparent linear slit.

3. The imaging system of claim 2, and means to rotate said body of radiation-opaque material.

4. The imaging system of claim 3, and wherein the rotation of said body of radiation-opaque material is in steps of a predetermined sequence.

5. The imaging system of claim 1, and wherein said optical ray-guiding means is in the form of a mask having at least two spaced, optically opaque areas with an intervening optically transparent area.

6. The imaging system of claim 5, and wherein said opaque areas cover approximately half of the area of said mask.

7. The imaging system of claim 5, and wherein the optically transparent area is centrally located between said two optically opaque areas.

8. The imaging system of claim 1, and wherein said optical ray-guiding means is in the form of a lens.

9. The imaging system of claim 8, and wherein said lens is of the cylindrical type focussed toward the photoelectric detection units.

10. The imaging system of claim 1, and wherein the optical ray path between said photoelectric detection units and said scintillation crystal means comprises internally-reflecting transparent block means, with said optical ray-guiding means incorporated in the intermediate portion of said transparent block means.

11. The imaging system of claim 1, and optical reflection means on opposite sides of the space between said photoelectric detection units and said scintillation crystal means.

12. The imaging system of claim 11, and wherein said optical reflection means comprises respective opposite plane mirrors.

13. The imaging system of claim 11, and wherein said optical ray-guiding means is in the form of opaque mask means having two spaced optically opaque areas with an intervening optically transparent area, said opaque areas having bottom reflective surfaces facing said scintillation crystal means.

14. The imaging system of claim 13, and wherein said bottom reflective surfaces comprise cylindrical mirrors.

15. The imaging system of claim 1, and wherein said scintillation camera device comprises four substantially square photoelectric detection units forming a substantially square block for receiving optical photons from scintillations in said crystal means and wherein the ray-guiding means distributes the optical photons from a scintillation to the respective photoelectric detection units to generate respective resultant signals which can be utilized to compute image coordinate values of said object in two predetermined directions perpendicular to each other.

16. The imaging system of claim 15, and wherein said optical ray-guiding means is in the form of square opaque mask means formed to control the optical photons with respect to said two directions.

17. The imaging system of claim 15, and wherein the optical ray path between the four photoelectric detection units and the scintillation crystal means comprises internally-reflecting transparent block means, with said optical ray-guiding means incorporated in the intermediate portion of said transparent block means.

18. The imaging system of claim 15, and wherein said optical ray-guiding means is in the form of a square body with a transparent square control portion and an opaque perimeter area which constitutes approximately 75% of the total square body area.

19. The imaging system of claim 15, and wherein said optical ray-guiding means is in the form of a square body with a transparent central portion and respective lens-shaped quadrant portions.

20. The imaging system of claim 19, and wherein the lens-shaped quadrant portions have opaque top surface layers, said layers having reflective bottom surfaces facing the scintillation crystal means.

21. The imaging system of claim 15, and wherein said optical ray-guiding means is in the form of a square body with a transparent central portion and respective lens-shaped quadrant portions, said quadrant portions comprising the respective quadrants of a spherical lens.

22. The imaging system of claim 1, and wherein the scintillation crystal means is provided on its bottom surface with a thin diffuse-reflecting backing.

23. The imaging system of claim 22, and wherein said optical ray-guiding means includes reflective means facing said scintillation crystal means for returning light rays to said diffuse-reflecting backing for redirection.

24. The imaging system of claim 23, and wherein said reflecting means comprises opposite transversely extending marginal focussing mirrors facing the scintillation crystal means.

25. The imaging system of claim 24, and wherein inwardly reflecting surfaces are provided on opposite sides of the region between said ray-guiding means and said scintillation crystal means.

* * * * *